(12) United States Patent
Bausewein et al.

(10) Patent No.: US 9,291,760 B2
(45) Date of Patent: Mar. 22, 2016

(54) COUPLING-IN APPARATUS FOR COUPLING LIGHT FROM A LIGHT-EMITTING DIODE INTO A FIBER ENTRY END AND LIGHT-SOURCE ARRANGEMENT FITTED THEREWITH

(71) Applicant: Carl Zeiss Meditec AG, Jena (DE)

(72) Inventors: Markus Bausewein, Aalen (DE); Peter Reimer, Ellwangen (DE)

(73) Assignee: Carl Zeiss Meditec AG, Jena (DE)

( * ) Notice: Subject to any disclaimer, the term of this patent is extended or adjusted under 35 U.S.C. 154(b) by 367 days.

(21) Appl. No.: 13/743,657

(22) Filed: Jan. 17, 2013

(65) Prior Publication Data

US 2013/0188385 A1   Jul. 25, 2013

(30) Foreign Application Priority Data

Jan. 19, 2012 (DE) .......................... 10 2012 100 408

(51) Int. Cl.
  *G02B 6/26* (2006.01)
  *F21V 8/00* (2006.01)
  *G02B 21/06* (2006.01)
  *G02B 6/35* (2006.01)
  *G02B 6/42* (2006.01)
  *G02B 21/00* (2006.01)

(52) U.S. Cl.
  CPC ............ *G02B 6/0006* (2013.01); *G02B 6/3598* (2013.01); *G02B 21/06* (2013.01); *G02B 6/3508* (2013.01); *G02B 6/4296* (2013.01); *G02B 21/0012* (2013.01)

(58) Field of Classification Search
  CPC ............... F21V 9/16; F21V 9/00; F21V 8/00; F21V 2200/10; F21V 2200/13; F21V 220/15; F21V 2200/17; A61B 19/5223; A61B 19/5225; A61B 19/52; G02B 7/001; G02B 7/005; G02B 7/006; G02B 21/00; G02B 21/06; G02B 21/0012; G02B 6/0006; G02B 6/3598; G02B 6/4296; G02B 6/3508
  USPC ............... 385/25; 362/551, 555, 583, 558, 84
  See application file for complete search history.

(56) References Cited

U.S. PATENT DOCUMENTS

| | | | | | |
|---|---|---|---|---|---|
| 3,769,963 | A | * | 11/1973 | Goldman et al. ............. | 600/476 |
| 4,633,872 | A | * | 1/1987 | Chaffee et al. .................. | 606/11 |
| 5,093,866 | A | * | 3/1992 | Douglas-Hamilton et al. ............................. | 382/133 |
| 5,272,330 | A | * | 12/1993 | Betzig et al. ................... | 250/216 |
| 6,661,571 | B1 | * | 12/2003 | Shioda et al. ................. | 359/372 |

(Continued)

OTHER PUBLICATIONS

German Office Action of Sep. 10, 2012.

*Primary Examiner* — Ryan Lepisto
*Assistant Examiner* — Guy Anderson
(74) *Attorney, Agent, or Firm* — Nixon Peabody LLP; Jeffrey L. Costellia

(57) ABSTRACT

A coupling-in apparatus is provided for coupling light from a light-emitting diode (1) into a fiber entry end (5) of at least one optical fiber (3). The coupling-in apparatus has a changing device (7) and a first light-guide element (13-19) arranged on the changing device (7). The first light-guide element (13-19) has specific transmission properties, an entry end (27) and an exit end (29). The changing device (7, 107) can be arranged and moved into a position with respect to the light-emitting diode (1) and the fiber entry end (5) such that the entry end (27) of the light-guide element (13-19) lies opposite the light-emitting diode (1) and the exit end (29) of the light-guide element (13-19) lies opposite the fiber entry end (5).

15 Claims, 3 Drawing Sheets

(56) References Cited

U.S. PATENT DOCUMENTS

| | | |
|---|---|---|
| 7,262,910 B2 | 8/2007 | Seel et al. |
| 2004/0105644 A1 | 6/2004 | Dawes |
| 2004/0135093 A1 | 7/2004 | Engel et al. |
| 2007/0070294 A1* | 3/2007 | Kim .............................. 351/206 |
| 2007/0091939 A1* | 4/2007 | Yoshikawa et al. ............... 372/2 |
| 2009/0273757 A1* | 11/2009 | Merz et al. .................... 351/214 |
| 2011/0037947 A1* | 2/2011 | Reimer et al. ................. 351/221 |
| 2011/0116694 A1* | 5/2011 | Gareau ......................... 382/128 |
| 2012/0176769 A1 | 7/2012 | Reimer et al. |
| 2013/0188385 A1* | 7/2013 | Bausewein et al. ........... 362/555 |

* cited by examiner

COUPLING-IN APPARATUS FOR COUPLING LIGHT FROM A LIGHT-EMITTING DIODE INTO A FIBER ENTRY END AND LIGHT-SOURCE ARRANGEMENT FITTED THEREWITH

BACKGROUND OF THE INVENTION

1. Field of the Invention

The present invention relates to the coupling of light from a light-emitting diode into at least one optical fiber. The apparatus in particular relates to a coupling-in apparatus for coupling light from a light-emitting diode into a fiber entry end of at least one optical fiber and to a light-source arrangement having a coupling-in apparatus of this type.

2. Description of the Related Art

There are optical apparatuses which require high-power light sources, but where the arrangement of the primary light source on the apparatus itself is not possible or desirable. One example of a apparatus of this type is a surgical microscope, which typically requires a high-power light source for illuminating the operating area. Since such a surgical microscope should limit the movement range of the doctor using the microscope as little as possible, the aim is to design surgical microscopes to be as compact as possible. One option for saving installation space inside the surgical microscope is to move the high-power light source into a region of the microscope body and to guide the light from the light source via an optical fiber or a fiber bundle into the illumination device of the microscope. Additionally, fans for cooling the high-power light source are typically necessary, which can result in vibrations which, if possible, should not be coupled into the surgical microscope. This is another aspect in respect of which it is advantageous to arrange the actual high-power light source at a distance from the surgical microscope and to guide the light into the illumination device of the surgical microscope using an optical fiber or a fiber bundle.

The high-power light sources used nowadays are increasingly high-power light-emitting diodes, because they have a higher efficiency for example as compared to xenon gas discharge lamps or halogen incandescent lamps and thus generate less heat. However, cooling has not yet become completely dispensible, and the problems relating to installation space also in principle remain, which is why the light from high-power LEDs is frequently transported to the site of use by way of optical fibers.

Today's fiber-coupled high-power light sources are frequently based on large high-power LED chips, on which an optical fiber is arranged using a butt coupling. In the case of such a butt coupling, the fiber entry end is moved as closely as possible to the luminous face of the LED in order to minimize optical losses in the air gap. A butt coupling is described in DE 10 2009 054 392 A1, for example.

Against this state of the art, it is an object of the present invention to provide an advantageous coupling-in apparatus for coupling light from a light-emitting diode into a fiber entry end. It is another object to provide an advantageous light-source arrangement having a light-emitting diode and at least one optical fiber, into which the light from the light-emitting diode is coupled.

The first object is achieved by a coupling-in apparatus according to claim 1, and the second object is achieved by a light-source arrangement according to claim 10. The dependent claims include advantageous configurations of the invention.

SUMMARY OF THE INVENTION

One coupling-in apparatus according to the invention for coupling light from a light-emitting diode, in particular a high-power LED, into a fiber entry end with at least one optical fiber comprises at least one light-guide element, which has a specific transmission property and which has an entry end that should be faced toward the light-emitting diode and an exit end that should be faced toward the fiber entry end. The coupling-in apparatus furthermore comprises a changing device on which the light-guide element is arranged. The changing device can be arranged and moved into a position with respect to the light-emitting diode and the fiber entry end such that the entry end of the light-guide element lies opposite the light-emitting diode and the exit end of the light-guide element lies opposite the fiber entry end.

The changing device according to the invention permits the precise and quick introduction of a light-guide element that influences the transmission properties of the light into the beam path between the light-emitting diode and the fiber entry end. The transmission properties of the light coupled into the fiber entry end, such as for example its spectral properties, its polarization properties etc., can thus be changed quickly without great effort. In the simplest case, the light-guide element can be a spectral filter, a polarization filter etc. However, the light-guide element could also be configured as an element which comprises a spectral filter, a polarization filter etc. in addition to other elements.

In a further configuration, the coupling-in apparatus can comprise at least a first light-guide element and a second light-guide element, which differ from each other in terms of their transmission properties, each have an entry end that should be faced toward the light-emitting diode and an exit end that should be faced toward the fiber entry end, and are arranged on the changing device. In this configuration, the changing device can be moved into a first position and at least a second position. In the first position, the entry end of the first light-guide element is situated opposite the light-emitting diode and the exit end of the first light-guide element is situated opposite the fiber entry end. In the second position, the entry end of the second light-guide element is situated opposite the light-emitting diode and the exit end of the second light-guide element is situated opposite the fiber entry end. If more than two light-guide elements are arranged on the changing device, a corresponding number of additional positions are available. The changing device in that case can comprise for example a rotatable disk, a linear carriage, a pivot device etc., on which the light-guide elements are arranged.

Using a changing device that is configured according to the described further configuration, the various light-guide elements can, depending on the requirements, be positioned between the LED and the fiber entry end, by way of which the properties of the transmitted light can be influenced. In this case, the changing device can be configured to be positionable with such exactitude and the light-guide elements can have such exact dimensions that the gap between the LED and the entry end of the currently used light-guide element and the gap between the exit end of the light-guide element and the fiber entry end can be kept minimal. It is thus possible to achieve a light yield similar to that in the case of a butt coupling. Light-guide elements having a rigid main body are particularly suitable for exact positioning with small distances between the ends of the light-guide element and the LED or the fiber entry end. Such main bodies can be manufactured with very precise dimensions and, using the changing device, be positioned exactly and reproducibly between the LED and the fiber entry end. Other than light-guide rods, integrator rods can also be used as rigid main bodies. Such an integrator rod leads to an equalization of the incident light intensity at its exit end by a light beam incident on the entry end being reflected in the integrator rod more or less frequently, depending on its entry position and its entry angle, before it exits through the exit end.

The different transmission properties in the light-guide elements can be implemented in particular in that at least one of the light-guide elements comprises a spectral filter. In this case, a spectral filter can be configured as an integral material region of a main body, wherein the integral region in the extreme case can constitute the entire main body. Alternatively, a spectral filter can be configured as a layer applied onto the main body, for example in the form of a dielectric layer. In another alternative, a spectral filter can be configured as a spectral filter element that is fitted or can be fitted on the main body. If the spectral filter is configured as a spectral filter element which is fitted on or can be fitted on the main body, it is advantageous to reduce the length dimension of the main body on which the spectral filter is fitted or can be fitted with respect to a main body on which no spectral filter is fitted or can be fitted, to be precise to reduce it by the length dimension of the spectral filter element. This way it is possible that there are no larger distances between the entry end of the light-guide element and LED and between the exit end of the light-guide element and the fiber entry element in a main body on which no spectral filter element is fitted or can be fitted than there are in a main body with a fitted spectral filter element. In principle, however, the invention can be realized with main bodies of in each case identical length, wherein in the case of a light-guide element having a main body without a fitted spectral filter element, however, there is a larger distance between the exit end of the light-guide element and the fiber entry end or between the entry end of the light-guide element and the light-emitting diode than there is in a light-guide element having a main body and fitted spectral filter element.

The coupling-in apparatus according to the invention can comprise a holder for the optical fiber, which permits displacement of the optical fiber such that the fiber entry end can be moved toward the light-emitting diode and away from the light-emitting diode. If light-guide elements of different lengths are present in the coupling-in apparatus, the holder for the optical fiber can be coupled to the changing device in particular such that, during a change between light-guide elements of different lengths, the optical fiber is displaced such that the distance between the fiber entry end and the exit end of the light-guide element always remains the same, independent of the length of the particular light-guide element. In this manner, changing the light-guide element does not result in a change in the coupling-in loss caused by the air gap. In particular, the losses can thus be kept minimal.

In the coupling-in apparatus according to the invention, the changing device can also be moveable into a position in which all light-guide elements are arranged outside the beam path between the light-emitting diode and the fiber entry end. In this case it is advantageous if the holder for the optical fiber and the changing device are coupled together such that, when all light-guide elements are arranged outside the beam path between the light-emitting diode and the fiber entry end, the optical fiber is displaced such that the distance between the fiber entry end and the light-emitting diode is reduced to a minimum. In this manner, the coupling-in losses can be kept minimal even if no light-guide element is arranged between the light-emitting diode and the fiber entry end.

According to another aspect of the invention, an advantageous light-source arrangement is additionally provided. This light-source arrangement comprises at least one light-emitting diode as the light source, which can be configured in particular as a high-power LED, at least one optical fiber having a fiber entry end for coupling in light from the light-emitting diode, and a coupling-in apparatus according to the invention arranged between the light-emitting diode and the fiber entry end. The properties and advantages of the light-source arrangement that are to be achieved by the use of the coupling-in apparatus according to the invention result directly from the abovementioned properties and advantages of the coupling-in apparatus according to the invention.

Further features, properties and advantages of the present invention can be gathered from the following description of exemplary embodiments with reference to the accompanying figures.

DETAILED DESCRIPTION OF THE PREFERRED EMBODIMENTS

A first exemplary embodiment for a light-source arrangement according to the invention, which comprises a coupling-in apparatus according to the invention, is described below with reference to FIGS. 1 and 2.

Figure 1:
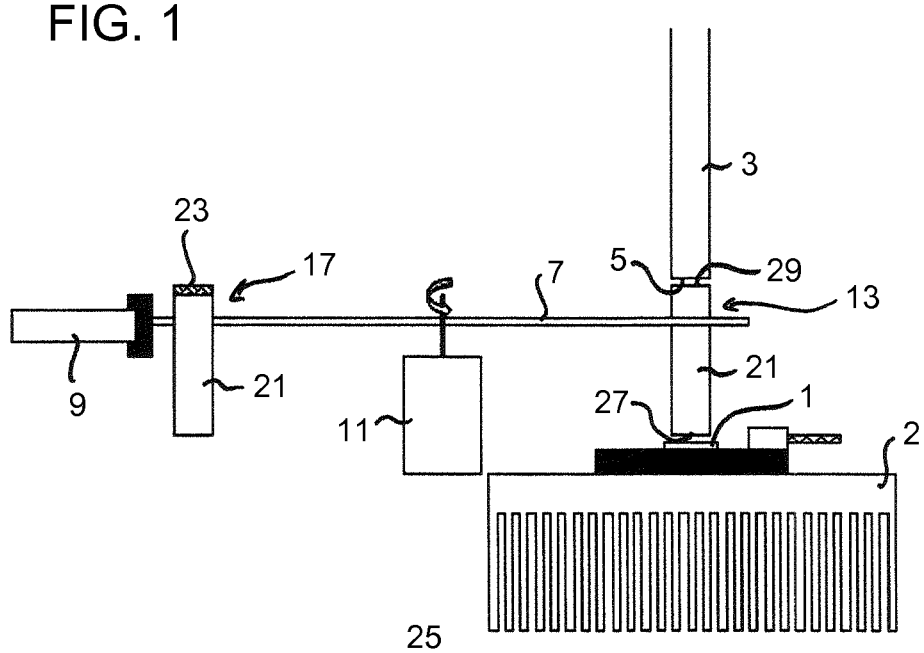
FIG. 1 shows a side view of a first exemplary embodiment for a light-source arrangement according to the invention.

FIG. 1 shows a side view of the first exemplary embodiment of the light-source arrangement according to the invention. The light-source arrangement comprises a high-power LED 1, which is arranged on a heat sink 2, and an optical fiber 3, which comprises a fiber entry end 5 arranged at a distance from the LED 1. Arranged between the optical fiber 3 and the LED 1 is a coupling-in apparatus which in the present exemplary embodiment comprises a rotatable disk 7, which can be positioned very exactly and reproducibly using a position encoder 9. The rotatable disk 7 is driven by an electric motor 11.

Figure 2:
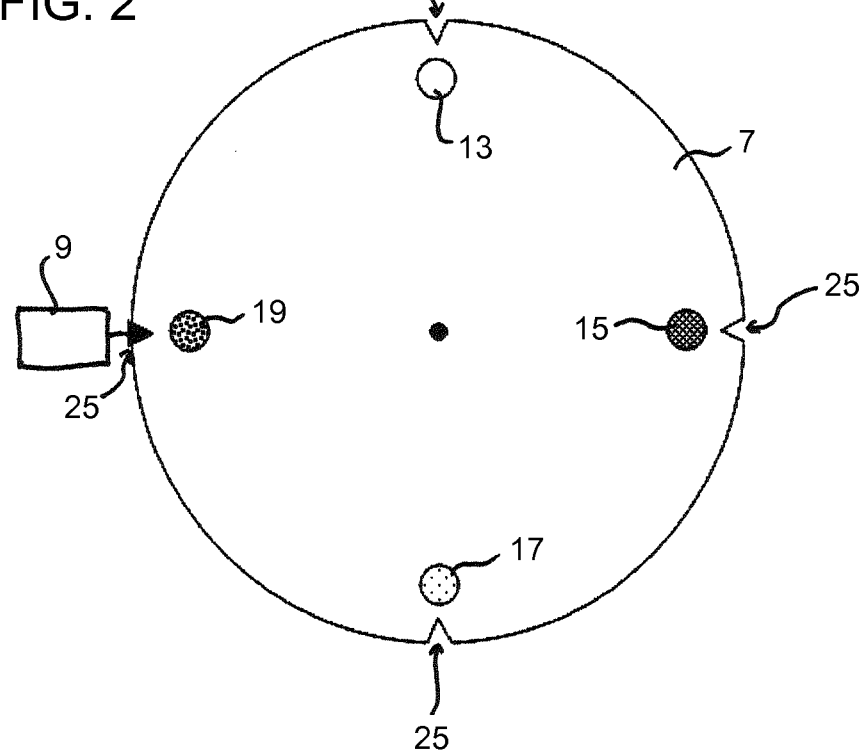
FIG. 2 shows a plan view of a detail from FIG. 1.

FIG. 2 illustrates a plan view of the rotatable disk 7. The disk 7 in the exemplary embodiment illustrated carries four light-guide elements 13 to 19 with different transmission properties. Each of the four light-guide elements comprises a rigid main body in the form of a light-guide rod 21, which has as high a transmissivity as possible for as broad a spectral range of the light emitted by the light-emitting diode as possible. Three of the four light-guide elements 15, 17, 19 are additionally provided with a spectral filter layer 23 applied onto the particular light-guide rod, with the spectral filter layers each having different spectral transmission properties. The lengths of the light rods provided with the spectral filters 23 are in this case reduced, with respect to the light-guide rod without spectral filter, by the magnitude of the applied spectral filter 23 such that the lengths of the light-guide elements 13, 15, 17, 19 are in each case identical. In other words, the lengths of the light-guide rods 15, 17, 19 including the applied spectral filters 23 corresponds to the length of the light-guide rod 13 without spectral filter.

Disposed on the edge of the rotatable disk 7 are index markings 25, which in each case mark the position of a light-guide element 13, 15, 17, 19. The rotatable disk 7 can be positioned precisely and reproducibly by way of the index markings 25 using the position encoder 9. The index markings are here disposed such that, in each of the reproducible positions of the rotatable disk 7, one of the light-guide elements 13, 15, 17, 19 is arranged between the light-emitting diode 1 and the fiber entry end 5 of the optical fiber 3. In this position, the entry end 27 of the corresponding light-guide element faces the light-emitting diode 1, and its exit end 29 faces the fiber entry end 5. The length dimensions of the light-guide elements are here matched to the distance between the fiber entry end 5 and the light-emitting diode 1 such that the gap between the entry end of the respective light-guide element 13 to 19 and the light-emitting diode 1 and also the gap between exit end 29 of the light-guide element 13, 15, 17, 19 and the fiber entry end 5 are as small as possible, without the rotation of the disk with the light-guide elements 13, 15, 17, 19 arranged thereon being obstructed in the process. The minimum possible distance is dependent on the exactitude of the positioning and the manufacturing technology used to manufacture and assemble the individual components.

By rotating the rotatable disk 7 into a different index position, a change from one light-guide element to another light-guide element can be effected, as a result of which the spectral properties of the light coupled into the optical fiber 3 can be varied.

Figure 3:
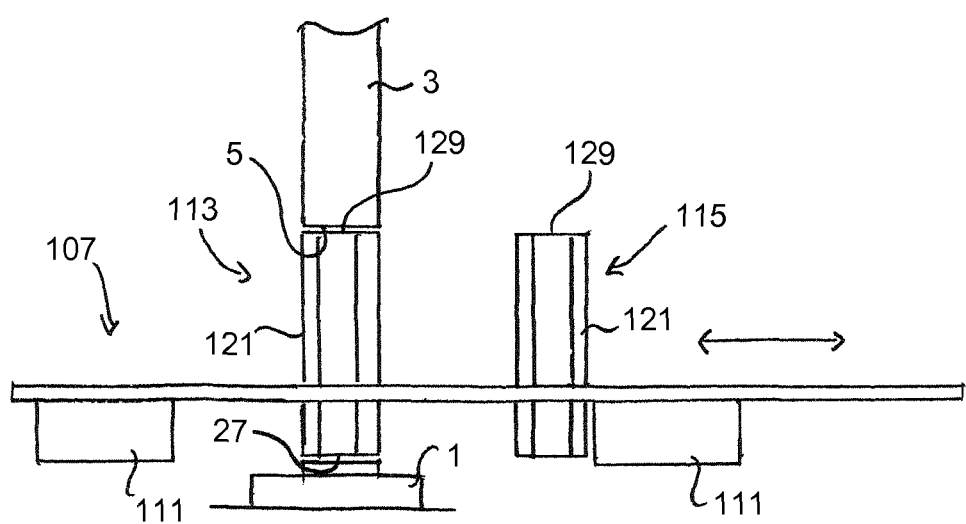
FIG. 3 shows a side view of a second exemplary embodiment for a light-source arrangement according to the invention.

A second exemplary embodiment for a light-source arrangement according to the invention is illustrated in side view in FIG. 3. As in the first exemplary embodiment, the arrangement comprises a light-emitting diode 1, an optical fiber 3 having a fiber entry end 5 facing the light-emitting diode 1, and a coupling-in apparatus for coupling the light from the light-emitting diode 1 into the fiber entry end 5. The second exemplary embodiment differs from the first exemplary embodiment only in the configuration of the coupling-in apparatus. In the second exemplary embodiment, the coupling-in apparatus comprises a linear carriage 107, which in the present exemplary embodiment can be moved in the direction of the double-headed arrow by two linear motors 111 that are coupled together. The linear carriage 107 carries two light-guide elements 113, 115, which can be pushed alternately between the light-emitting diode 1 and the optical fiber 3 by displacing the linear carriage.

In the present exemplary embodiment, the light-guide elements 113, 115 comprise in each case a hexagonal integrator rod as the rigid main body 121, wherein the two main bodies 121 differ from each other in terms of their spectral transmission properties. This can be realized, as in the first exemplary embodiment, by a spectral filter layer applied onto the integrator rod or by one of the integrator rods 121 being made from a material with other spectral transmission properties or at least a material region having other spectral transmission properties.

The linear motors 111 are used for an exact and reproducible adjustment of the linear carriage 107 such that the light-guide element 113 or the light-guide element 115 is optionally arranged between the light-emitting diode 1 and the fiber entry end 5. The reproducible positioning of the linear carriage 107 can be marked by way of example by the abutment positions of the linear motors if only two light-guide elements are present. If more than two light-guide elements 113, 115 are present, the exact and reproducible positioning can be realized using a position encoder together with an index on the linear carriage 107.

Like the dimensions of the light-guide rods in the first exemplary embodiment, the dimensions of the integrator rods 121 in the second exemplary embodiment are selected such that the distances between the light-emitting diode 1 and the entry end 127 of a light-guide element or between the exit end 129 of a light-guide element and the fiber entry end 5 are as small as possible. What was stated here with respect to the first exemplary embodiment relating to the dimension of the rigid main body similarly applies in the second exemplary embodiment.

The integrator rods 121 illustrated in the second exemplary embodiment have a hexagonal cross section. In principle, however, they can also have another cross section in particular in the form of a polygon, such as for example a triangular, square or octagonal cross section. However, a hexagonal cross section is particularly suited with respect to the light losses between the hexagonal cross-sectional area of the integrator rod and the round cross-sectional area of the optical fiber on the one hand and the integration properties of the integrator rod on the other hand. A cross-sectional area with fewer angles might improve the integration properties, but the light losses would be greater, since for example a square cross-sectional area can be matched to the round cross-sectional area of the optical fiber with more difficulty than a hexagonal cross-sectional area. In principle, the more angles a polygonal cross-sectional area of the integrator rod has, the better the matching that is possible. With an increasing number of angles of the cross-sectional area of the integrator rod, however, the integration properties reduce such that a hexagonal cross-sectional area provides a good compromise between the integration property on the one hand and the light loss on the other.

Figure 4:
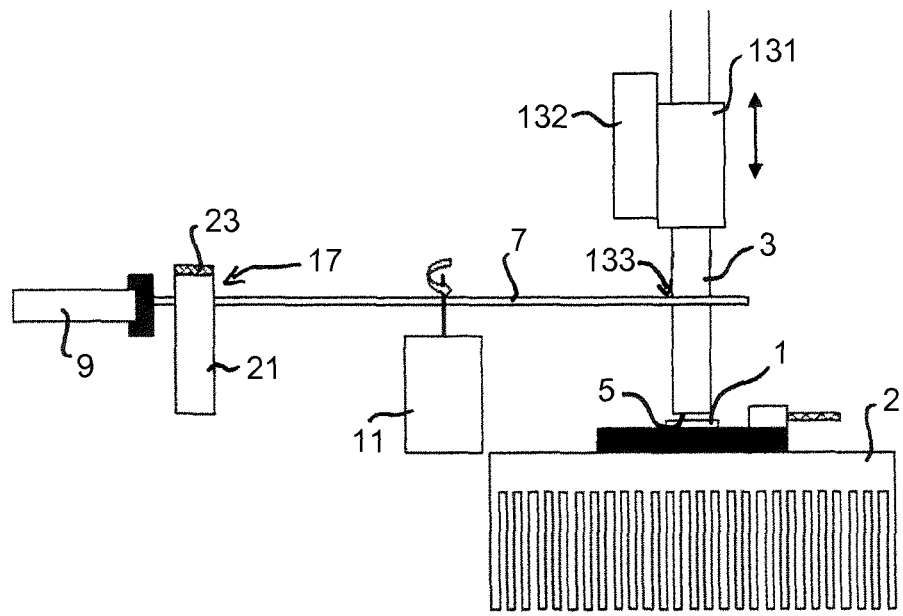
FIG. 4 shows a side view of a third exemplary embodiment for a light-source arrangement according to the invention.
Figure 5:
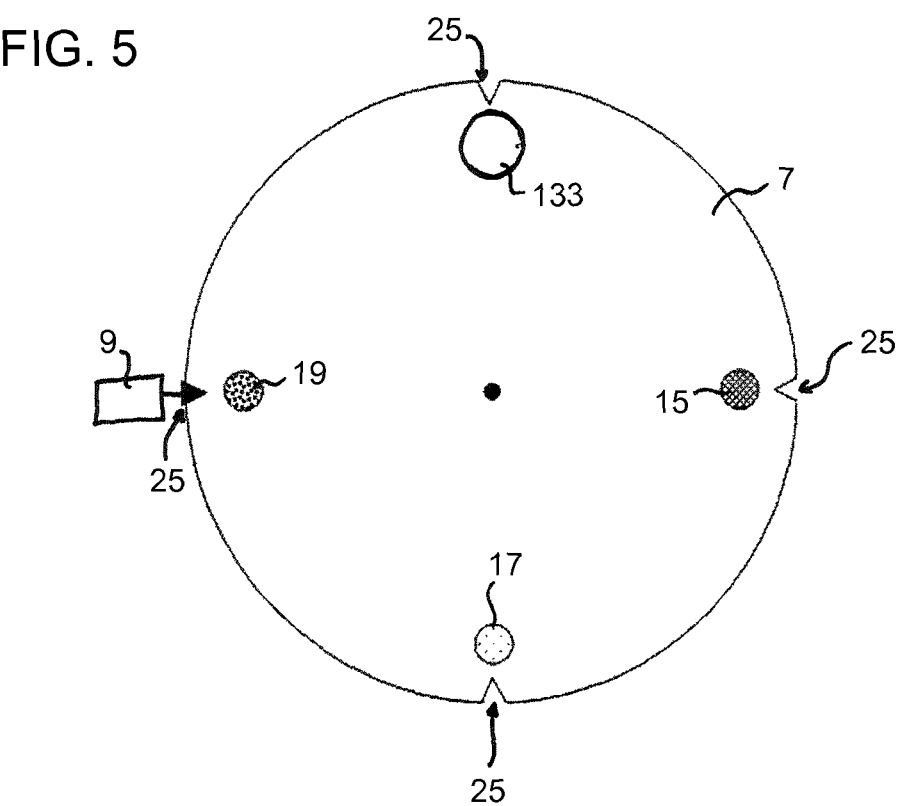
FIG. 5 shows a plan view of a detail from FIG. 4.

A third exemplary embodiment for the coupling-in apparatus according to the invention is illustrated in FIGS. 4 and 5. The third exemplary embodiment corresponds in large parts to the first exemplary embodiment, which is why the description of the third exemplary embodiment is limited to the differences with respect to the first exemplary embodiment. Elements of the third exemplary embodiment that correspond to elements of the first exemplary embodiment are designated in FIGS. 4 and 5 with the same reference numerals as in FIGS. 1 and 2, and will not be described again so as to avoid repetition.

In the third exemplary embodiment, the optical fiber 3 is held by a holder 131 which can be moved together with the optical fiber 3 in the axial direction of the fiber toward the light-emitting diode 1 and away therefrom using a linear motor 132 or another suitable drive, as is indicated by the double-headed arrow in FIG. 4. In addition, the coupling-in apparatus according to the third exemplary embodiment has only three light-guide elements 15, 17, 19, which are provided with spectral filters. Instead of the light-guide element 13 without spectral filter, as in the first exemplary embodiment, the rotatable disk 7 of the third exemplary embodiment has an opening 133 whose diameter is large enough to be able to guide the optical fiber 3 through the opening 133.

If the intention is for no spectral filter to be arranged between the fiber entry end 5 and the light-emitting diode 1, the rotatable disk 7 is rotated such that the opening 133 is situated between the optical fiber 3 and the light-emitting diode 1. The linear motor 132 is then used to displace the holder 131 with the optical fiber 3 held therein until the optical fiber 3 passes through the opening 133 and the distance between the fiber entry surface 5 and the light-emitting diode 1 is reduced to a minimum distance. Thereby, light losses through an air gap between the light-emitting diode 1 and the fiber entry end 5 that is too large can be avoided. The movement of the holder 131 and the movement of the rotatable disk 7 are here advantageously coupled with one another such that a rotation of the rotatable disk 7 is possible only if the distance between the fiber entry end 5 from the light-emitting diode 1 does not fall below a predetermined distance so as to avoid a collision of the disk 7 with the optical fiber 3.

The presence of the displaceable holder 131 additionally permits the use of light-guide elements 15, 17, 19 of different lengths. By displacing the holder 131 with the optical fiber 3 held therein, it is possible to match the position of the fiber entry end 5 to the length of the respective light-guide elements 15, 17, 19 such that, independently of the selected light-guide element 15, 17, 19, in each case the same, preferably minimum air gap between the exit end 29 of the light-guide element 15, 17, 19 and the fiber entry end 5 can be set.

The invention was explained by way of example with reference to three exemplary embodiments, wherein deviations from the exemplary embodiments illustrated are possible, however. For example, the spectral filter layer applied onto the main body need not necessarily be connected fixedly to the main body. Instead, it can be embedded in a spectral filter element which is for example part of a plug sleeve which can be plugged onto the main body or another suitable connection means. The number of the light-guide elements, which are arranged on the rotatable disk or the linear carriage, can also deviate from the number described in the exemplary embodiments. It is likewise conceivable to use, instead of the rotatable disk or the linear carriage, a pivot mechanism on which the light-guide elements are arranged. It is likewise possible in the exemplary embodiments for in each case in principle light-guide rods or integrator rods, or both light-guide rods and integrator rods to be used. The scope of the claimed invention is therefore defined by the claims and must not be limited to the subjects of the exemplary embodiments.

What is claimed is:

1. A coupling-in apparatus for coupling light from a light-emitting diode into a fiber entry end of at least one optical fiber, wherein the coupling-in apparatus comprises:
   at least one light-guide element including a rigid main body in the form of a rod, the at least one light-guide element configured to couple light from the light-emitting diode into the fiber entry end of the at least one optical fiber, the at least one light-guide element has a specific transmission property, has an entry end that faces the light-emitting diode, and an exit end that faces the fiber entry end, and
   a changing device on which the light-guide element is arranged, wherein the changing device is configured to be arranged and moved into a first position with respect to the light-emitting diode and the fiber entry end such that the entry end of the light-guide element lies opposite the light-emitting diode and the exit end of the light-guide element lies opposite the fiber entry end.

2. The coupling-in apparatus of claim 1, wherein the coupling-in apparatus comprises:
   at least a first light-guide element and a second light-guide element, which differ from each other in terms of their transmission properties and which each have an entry end that should be faced toward the light-emitting diode and an exit end that should be faced toward the fiber entry end, and
   the light-guide elements are arranged on the changing device and
   the changing device can be moved into a first position, in which the entry end of the first light-guide element is situated opposite the light-emitting diode and the exit end of the first light-guide element is situated opposite the fiber entry end, and can be moved into at least a second position, in which the entry end of the second light-guide element is situated opposite the light-emitting diode and the exit end of the second light-guide element is situated opposite the fiber entry end.

3. The coupling-in apparatus of claim 2, in which at least one of the light-guide elements comprises a spectral filter.

4. The coupling-in apparatus of claim 1, in which each light-guide element has at least one rigid main body.

5. The coupling-in apparatus of claim 4, in which at least one of the main bodies comprises a spectral filter configured as an integral material region of the main body or as a layer applied onto the main body.

6. The coupling-in apparatus of claim 4, in which the spectral filter is a spectral filter element that is fit on the main body.

7. The coupling-in apparatus of claim 6, in which the main body, on which the spectral filter element is fit, has a length dimension that is reduced by the dimension of the spectral filter element with respect to a main body on which no spectral filter element is fit.

8. The coupling-in apparatus of claim 4, wherein the main body is a light-guide rod or an integrator rod.

9. The coupling-in apparatus of claim 1, further comprising a holder for the optical fiber that permits displacement of the optical fiber so that the fiber entry end can be moved toward the light-emitting diode and away from the light-emitting diode.

10. The coupling-in apparatus of claim 9, in which light-guide elements of different lengths are present and the holder for the optical fiber is coupled to the changing device such that, during a change between light-guide elements of different lengths, the optical fiber is displaced such that the distance between the fiber entry end and the exit end of the light-guide element always remains the same, independent of the length of the particular light-guide element.

11. The coupling-in apparatus of claim 9, wherein the changing device can be moved into a position in which all light-guide elements are arranged outside the beam path between the light-emitting diode and the fiber entry end.

12. The coupling-in apparatus of claim 11, wherein the holder for the optical fiber and the changing device are coupled together such that, when all light-guide elements are arranged outside the beam path between the light-emitting diode and the fiber entry end, the optical fiber is displaced so that the distance between the fiber entry end and the light-emitting diode is reduced to a minimum.

13. The coupling-in apparatus of claim 1, wherein the changing device comprises a rotatable disk or a pivot device.

14. The coupling-in apparatus of claim 1, wherein the changing device comprises a linear carriage.

15. A light-source arrangement having at least one light-emitting diode as the light source, at least one optical fiber with a fiber entry end for coupling in light from the light-emitting diode, and the coupling-in apparatus of claim 1 arranged between the light-emitting diode and the fiber entry end.

* * * * *